US007769648B1

(12) United States Patent
Nolan

(10) Patent No.: US 7,769,648 B1
(45) Date of Patent: Aug. 3, 2010

(54) METHOD AND SYSTEM FOR AUTOMATING KEYWORD GENERATION, MANAGEMENT, AND DETERMINING EFFECTIVENESS

(75) Inventor: Sean Patrick Nolan, Bellevue, WA (US)

(73) Assignee: Drugstore.com, Bellevue, WA (US)

( * ) Notice: Subject to any disclaimer, the term of this patent is extended or adjusted under 35 U.S.C. 154(b) by 1311 days.

(21) Appl. No.: 10/728,663

(22) Filed: Dec. 4, 2003

(51) Int. Cl.
*G06F 15/02* (2006.01)

(52) U.S. Cl. ............................. 705/32; 705/7; 705/10; 705/14; 705/22; 705/26; 705/27; 705/28; 705/34; 707/1; 707/3; 707/6; 707/10

(58) Field of Classification Search ............... 705/32
See application file for complete search history.

(56) References Cited

U.S. PATENT DOCUMENTS

| 6,134,532 | A  | * | 10/2000 | Lazarus et al. | 705/14 |
|---|---|---|---|---|---|
| 6,873,967 | B1 | * | 3/2005 | Kalagnanam et al. | 705/26 |
| 2001/0051940 | A1 | * | 12/2001 | Soulanille | 707/3 |
| 2002/0052925 | A1 | * | 5/2002 | Kim et al. | 709/217 |
| 2002/0165849 | A1 | * | 11/2002 | Singh et al. | 707/1 |
| 2002/0169760 | A1 | * | 11/2002 | Cheung et al. | 707/3 |
| 2003/0033292 | A1 | * | 2/2003 | Meisel et al. | 707/3 |
| 2003/0220918 | A1 | * | 11/2003 | Roy et al. | 707/3 |
| 2004/0093327 | A1 | * | 5/2004 | Anderson et al. | 707/3 |
| 2004/0267725 | A1 | * | 12/2004 | Harik | 707/3 |
| 2005/0114198 | A1 | * | 5/2005 | Koningstein et al. | 705/10 |

OTHER PUBLICATIONS

Dou, Wenyu; Linn, Randy; Yang, Sixian. How Smart Are "Smart Banners"? Journal of Advertising Research. vol. 41, No. 4, p. 31, Jul.-Aug. 2001.*
Sceats, Mark, "Keyword Research—Picking The Right Keywords," http://www.viz.co.nz/search-engine-keywords.htm, Oct. 6, 2003.
"Search Engine Marketing Budges and ROI," http://www.viz.co.nz/budgets-ROI.htm, Oct. 6, 2003.
Scevak, Niki, "How The Search Engine Built Trust With Advertisers," http://www.searchutilities.com/news/archive/30/1326.html, Jan. 7, 2002.
Bloch, Michael, "Search Engines—Pay per View advertising," http://www.twsc.co.za/0202.php, Oct. 6, 2003.
"Search Engine Marketing Services," http://www.viz.co.nz/SEM-services.htm, Oct. 6, 2003.
"Search Engine Marketing Strategy," http://www.viz.co.nz/viz-approach.htm, Oct. 6, 2003.

(Continued)

*Primary Examiner*—F. Zeender
*Assistant Examiner*—Fawaad Haider
(74) *Attorney, Agent, or Firm*—Blakely, Sokoloff, Taylor & Zafman LLP

(57) ABSTRACT

A method and system for generating, management, and determining the cost effectiveness of keywords used in paid searches. Target objects for which customer traffic for an electronic storefront web site is to be targeted to are identified. Keywords corresponding to those target objects are automatically generated, and associated keyword purchase data is sent to one or more search partners to initiate purchase of the keywords from those partners. Cost-effectiveness of each keywords is determined based on partner reports containing billing and keyword activity data and monitoring customer session activities that are initiated via clickthroughs contained in search results generated by the search partners.

16 Claims, 16 Drawing Sheets

OTHER PUBLICATIONS

Sceats, Mark, "Web Site Traffic Analysis," http://www.viz.co.nz/traffic-monitoring.htm, Oct. 6, 2003.

Sceats, Mark, "Search Engine Pay for Inclusion Fees," http://www.viz.co.nz/search-engine-fees.htm, Oct. 6, 2003.

Sceats, Mark, "PPC Pay per Click Advertising," http://www.viz.co.nz/pay-per-click.htm, Oct. 6, 2003.

"Coremetrics Technology," http://www.coremetrics.com/technology/index.html?referringurl=http:%3A//www.coremetri..., Oct. 6, 2003.

"Coremetrics Unveils Marketing Management Center to Automatically Detect Measure and Compare Performance of All Online Marketing Programs," http://www.coremetrics.com/news/media/pr02_11_18_management.hmtl, Oct. 6, 2003.

* cited by examiner

| Field | Max Length | Value |
|---|---|---|
| description1 | 35 | Discover Beauty.com. Shop Prestige |
| description2 | 35 | Brands & Top Sellers. Ships Free |
| displayurl | 35 | www.beauty.com |
| headline | 25 | Buy {{name}} |
| headline-1 | 25 | {{name}} |
| headline-2 | 25 | Buy it at beauty.com |

*Fig. 5b*

550B 552 (TYP)  554 (TYP)  556 (TYP)

| Field | Max Length | Value |
|---|---|---|
| description1 | 35 | Private Shopping & Trusted Source |
| description2 | 35 | Low Prices, Ships Free w/ $49 spend |
| displayurl | 35 | www.sexual-well-being.com |
| headline | 25 | Buy {{name}} - Great Deal |
| headline-1 | 25 | {{name}} - {{price}} |
| headline-2 | 25 | {{name}} |
| headline-3 | 25 | Buy it at drugstore.com |

558 → Field
558 → description1
560 → description2
562 → displayurl
564 → headline
564 → headline-1
564 → headline-2

| Field | Max Length | Value |
|---|---|---|
| description1 | 35 | In Stock & Priced to Sell. Free |
| description2 | 35 | Ship available. Supplies Limited |
| displayurl | 35 | www.drugstore.com |
| headline | 25 | Buy {{name}} - Great Deal |
| headline-1 | 25 | {{name}} - {{price}} |
| headline-2 | 25 | {{name}} |
| headline-3 | 25 | Buy it at drugstore.com |

| Field | Max Length | Value |
|---|---|---|
| description1 | 35 | Discover Beauty.com. Shop Prestige |
| description2 | 35 | Brands & Top Sellers. Ships Free |
| displayurl | 35 | www.beauty.com |
| headline | 25 | Buy {{name}} Cosmetics |
| headline-1 | 25 | Buy {{name}} |
| headline-2 | 25 | {{name}} |
| headline-3 | 25 | Buy it at beauty.com |

| Field | Max Length | Value |
|---|---|---|
| description1 | 35 | See our Price-Match Guarantee |
| description2 | 35 | Nearly 4 Million Customers |
| displayurl | 35 | www.drugstore.com/strivectin |
| headline | 25 | Strivectin Ships For Free |

| Field | Max Length | Value |
|---|---|---|
| description1 | 35 | Low Prices on Top Selling Brands |
| description2 | 35 | Shop with a Trusted Online Store |
| displayurl | 35 | www.drugstore.com |
| headline | 25 | Buy {{keyword}} |
| headline-1 | 25 | {{keyword}} |
| headline-2 | 25 | Buy it at drugstore.com |

| ATTRIBUTE | VALUE |
|---|---|
| Date | 9/29/2003 |
| Campaign | XSP1 |
| Ad Group | AG7 |
| Keyword | strivectin sd |
| Keyword Status | Active |
| Headline | Strivectin - Lowest Price |
| Description Line 1 | Ships for Free, Your Trusted Source |
| Description Line 2 | drugstore.com millions of customers |
| Display URL | www.drugstore.com |
| Destination URL | http://www.drugstore.com/user/promo.asp?code=198E01AB&aid=336064&aparam=xsp39795 |
| Maximum CPC | $1.85 |
| Impressions | 125 |
| Clicks | 20 |
| Cost | $26.03 |
| Avg Position | 0.9 |

*Fig. 7b*

METHOD AND SYSTEM FOR AUTOMATING KEYWORD GENERATION, MANAGEMENT, AND DETERMINING EFFECTIVENESS

FIELD OF THE INVENTION

The field of the invention relates generally to electronic commerce and, more specifically but not exclusively relates to a mechanism for automating the generation, management, and measuring the effectiveness of keywords used to generate paid search results including click through links to Internet storefronts and the like.

BACKGROUND INFORMATION

The use of the Internet, also known as the World Wide Web (WWW or simply "Web"), has increased exponentially in recent years. Today, there are literally 100's of millions of Internet users who use the web for a variety of purposes, including browsing news sources, e-mail, school research, paid subscription viewing, auctions, and on-line purchasing. As a result, the demand for new content has also increased exponentially, resulting in the generation of billions of web pages hosted by millions of web sites.

The availability of billions of web pages creates a problem for both the user and the content provider. From the user's perspective, he or she would like to be able to browse web pages that have a particular content, such as details about a particular category of food (e.g., wine) or remedies for medical ailments. At the same time, the web site host generally would like to attract as many users to its site or sites as possible, especially if the host participates in e-commerce or generates revenue from advertisements. With literally billions of competing Web pages, how does a host target users to its site(s)?

In one respect, both of the foregoing problems are solved using the same mechanism—search engines. Search sites, such as Google®, AltaVista®, Overture®, Lycos®, etc., enable users to easily locate desired content via keyword searches describing the content. For example, if a user desires to obtain information about a particular event, the user merely needs to enter one or more keywords that are descriptive of the event into a search engine and a list of search results containing descriptions of relevant web pages and links to those pages are returned to the user's browser.

In general, there are two main activities performed at a search site. The first activity is content indexing, which comprises gathering web page content (and/or indicia indicative of the content), storing the content in very large databases, and indexing the content so that it may be easily searched. Typically, this is accomplished by using web "spiders" that gather web page content via HTML parsing and the like. In other instances, a web site may wish to have its content guaranteed to be indexed by paying an inclusion fee to a search site. Typically, such fees are per URL, and are often valuable for dynamic URL pages and pages that often change content. In general, the page content identification data that is stored by a given search engine differs, wherein some search engines stored the entire page content, while others store less information, such as titles, headers, first 20 words, etc. In addition, HTML, the language used to render Web pages, permits the use of "meta-tags," which enables a web designer to include content description in the HTML that is not displayed on the rendered page. Thus, meta-tags are another useful way to extract content description information for web pages.

The second activity performed by the search site is content searching. In most instances, the searching is based on one or more "keyword" or phrases included in a search request entered by a user. In response to a keyword search request, the search engine queries its database to identify indexed pages that have content pertaining to the keyword. The identified pages are then ranked based on proprietary algorithms, wherein the search engine returns results with a confidence or relevancy ranking, with the highest rankings appearing at the top of the list. In other words, the search engine orders the search results according to how closely it determines the content of those pages match the search query.

Most search engines use search term frequency as a primary way of determining whether a document is relevant. For instance, if you're researching diabetes and the word "diabetes" appears multiple times in a Web document, it's reasonable to assume that the document will contain useful information on diabetes. Therefore, a document that repeats the word "diabetes" over and over is likely to turn up near the top of a search results list. Some search engines consider both the frequency and the positioning of keywords to determine relevancy, reasoning that if the keywords appear early in the document, or in the headers, this increases the likelihood that the document is relevant. For example, Lycos® ranks hits according to how many times a search's keywords appear in their indices of the document and in which fields they appear (i.e., in headers, titles or text). It also takes into consideration whether the documents that emerge as hits are frequently linked to other documents on the Web, reasoning that if other people consider them important, you should, too.

Even when good search keywords are used, the returned search results are often lacking. Many times, the search result lists leave users confused, since, to the user, the results seem completely irrelevant to the search term entered. Basically, this is because search engine technology has yet to reach the point where humans and computers understand each other well enough to communicate clearly. For example, most search engines cannot determine the difference between words that have the same spelling, but different meanings. Although some search engines are geared toward "concept-based" of "natural language" searching, their results are still lacking.

Now to return to the other problem—that is, the problem of a web site host attracting traffic. A common way to receive traffic is via search results. However, when common keywords are used for search terms, literally 1000's or even 1,000,000's of results may be returned for a given search. Since most users will only wade through a few pages (if that many) of search page results, pages that are not listed on the first few pages (or even the first few in the list on the first results page) will never be viewed. Although the probability of a higher ranking may improve with the use of meta-tags, the vast number of web pages (including other web pages containing similar meta-tags) that may be returned for a given search typically prevents the addition of meta-tags alone from yielding adequate ranking improvement.

This problem is also addressed by the search engines. However, this time the service comes at a cost. The solution offered by the search engines is known as "paid searches." Under paid searches, clients, such as electronic storefronts, retailers, and the like, pay a search engine to return web page results that include their web pages at or near the top of the results list based on search hits containing one or more keywords. The paid search results are generally returned in one of two forms: 1) they are included in the context of "normal" search results (i.e., they appear the same as any other search result); or 2) they appear separate from the "normal" search results, often in a manner similar to (but less intrusive than) banner ads. For example, Google® provides paid keyword search results that are rendered adjacent to its normal result listings.

Typically, the client pays a "per-click" charge to the search engine each times a user clicks on a link in the list of search results (or in the separated results) that will take the user to the client's site, otherwise known as a "clickthrough." Generally, paid searches have been shown to be much more cost effective than banner advertisements (which are typically charged each time a page containing a banner ad is viewed, rather than how many times such an add is clicked). As a result, the use of paid searches have become increasingly popular with search engine clients. In response to the increased usage, the search engines have gone to a "bid" model, wherein each client places a bid for each keyword. Under this model, when multiple clients pay for the same keyword, the search results are ordered based on the ordering of the bids (i.e., highest to lowest bid).

A primary consideration for a paid search client is whether or not its keywords are cost-effective. That is, determining whether the marginal profit being derived from the increased traffic to the client's storefront is greater than the amount being paid for the keyword. Another consideration is keyword selection and search result appearance. While several companies presently provide services that are used to track keyword effectiveness, there are no existing solutions for automatically generating effective keywords and performing other aspects of keyword management.

SUMMARY OF THE INVENTION

A method and system for generating, management, and determining the cost effectiveness of keywords used in paid searches. Target objects for which customer traffic for an electronic storefront web site is to be targeted to are identified. Keywords corresponding to those target objects are automatically generated, and associated keyword purchase data is sent to one or more search partners to initiate purchase of the keywords from those partners. Cost-effectiveness of each keywords is determined based on partner reports containing billing and keyword activity data and monitoring customer session activities that are initiated via clickthroughs contained in search results generated by the search partners.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIGS. 5b-5g show respectively creative formats comprising search results templates used to build formatted search result data that is sent to search partners;

FIG. 7b shows a set of attributes and exemplary values corresponding to a partner report, according to one embodiment of the invention;

DETAILED DESCRIPTION OF PREFERRED EMBODIMENTS

Figure 1:
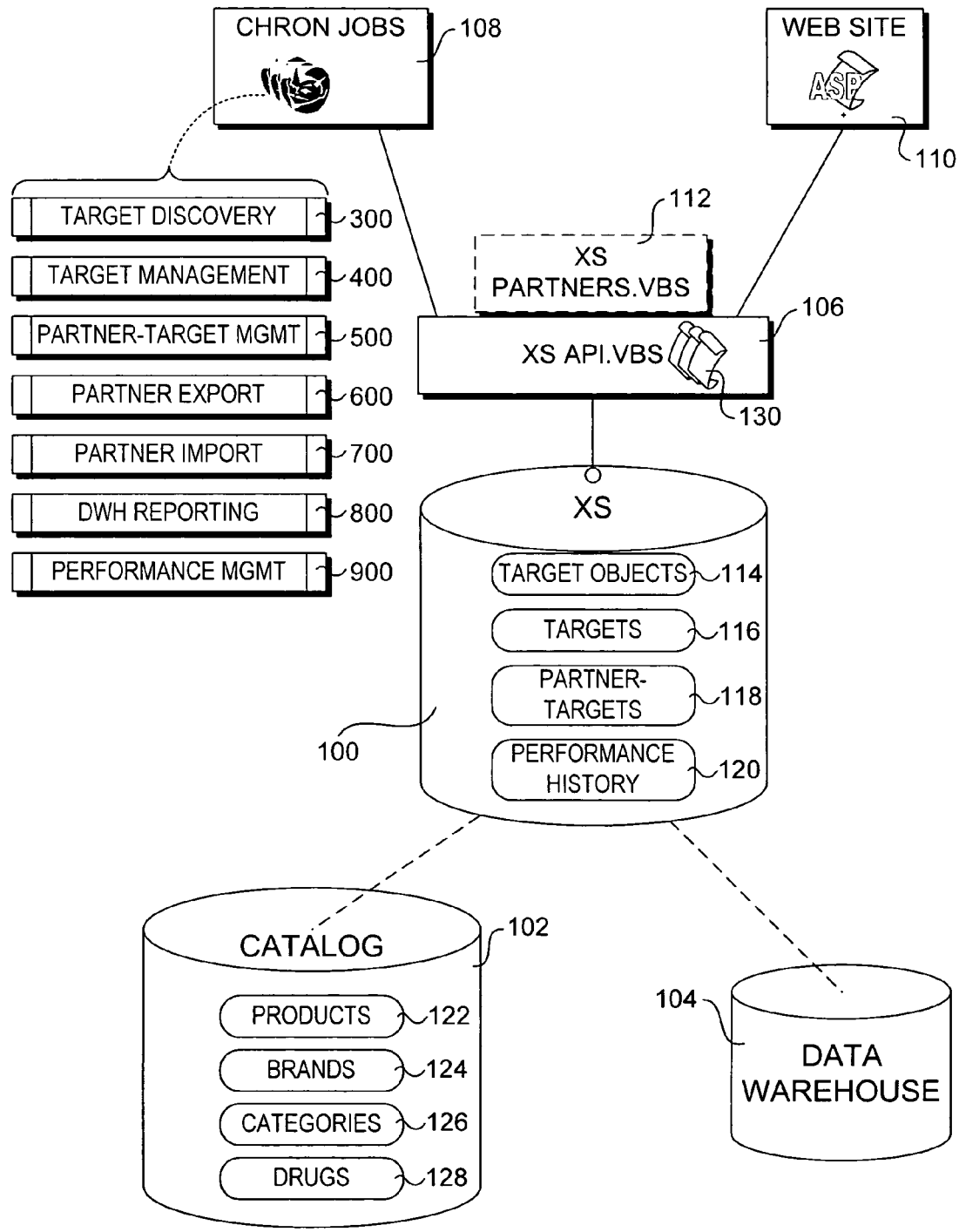
FIG. 1 is a schematic diagram illustrating a software architecture for facilitating automatic keyword management activities, according to one embodiment of the invention.

Embodiments of a method and system for automated keyword and paid search management are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Terminology

Throughout this specification, several terms of art are used. These terms are to take on their ordinary meaning in the art from which they come, unless specifically defined herein or the context of their use would clearly suggest otherwise. In addition, the following definitions are provided for terms that are particular to the invention, including:

Target Object: A target object is a storefront object to which a user is directed to in response to a click-though link activation. In one embodiment, a target object can be one of a product, brand, category, drug, search or custom link. The association of keywords with target objects allows one to automatically change prices, halt buys when objects go inactive, etc.

Target: In one embodiment, a target is a combination of a keyword (which may be empty) and a target object. Note that, for one object (e.g., one product), there may be multiple targets, one for each keyword purchased for that product.

Targets with empty keywords are used to track performance for paid inclusion partners; those with keywords are used for paid search partners.

Partner-Target: a partner-target represents a target as it relates to one partner (e.g., Google, Overture, etc.). In one embodiment, for each eligible target, a partner-target is created for each eligible partner. There is, for example, one partner-target for each keyword bought at a given partner.

Creative Format: In one embodiment, a creative format comprises marketing text associated with partner-targets for use in formatting search partner results. These can be assigned automatically per partner/target type/department, etc. They can also be assigned manually. A creative format may include the price of the target object as well as dynamic per-object properties.

Keyword: Keywords are search words or phrases that are to be entered via a search site to produce search results containing links to a target object, such as storefront home or particular item offered for purchase by the storefront. In one embodiment, keywords are associated with a target object as part of a target.

MPC: "Margin per click" is the measure by which keyword performance is rated. Everything but marketing costs are removed (ideally), so that a comparison can be made between CPC ("cost per click") and marginal profit per click to decide if a keyword is performing acceptably or not.

Software Architecture

One embodiment of an software architecture overview is shown in FIG. 1. Data for the system is primarily stored in three databases, including a central XS (eXternal Search) database 100, a catalog database 102, and a data warehouse 104. In addition to these databases, a typical electronic storefront site also has a database for storing user data and current/recent customer session data, such a purchase transactions. However, this database is not shown in FIG. 1 for clarity. Additional architecture components include an API (application programming interlace) 106, chronological (Chron) jobs 108, and a Web site 110. In addition, an optional XS Partners API component 112 may also be implemented in the architecture for receiving bulk data transfers from search partners, as described below.

Figure 2:
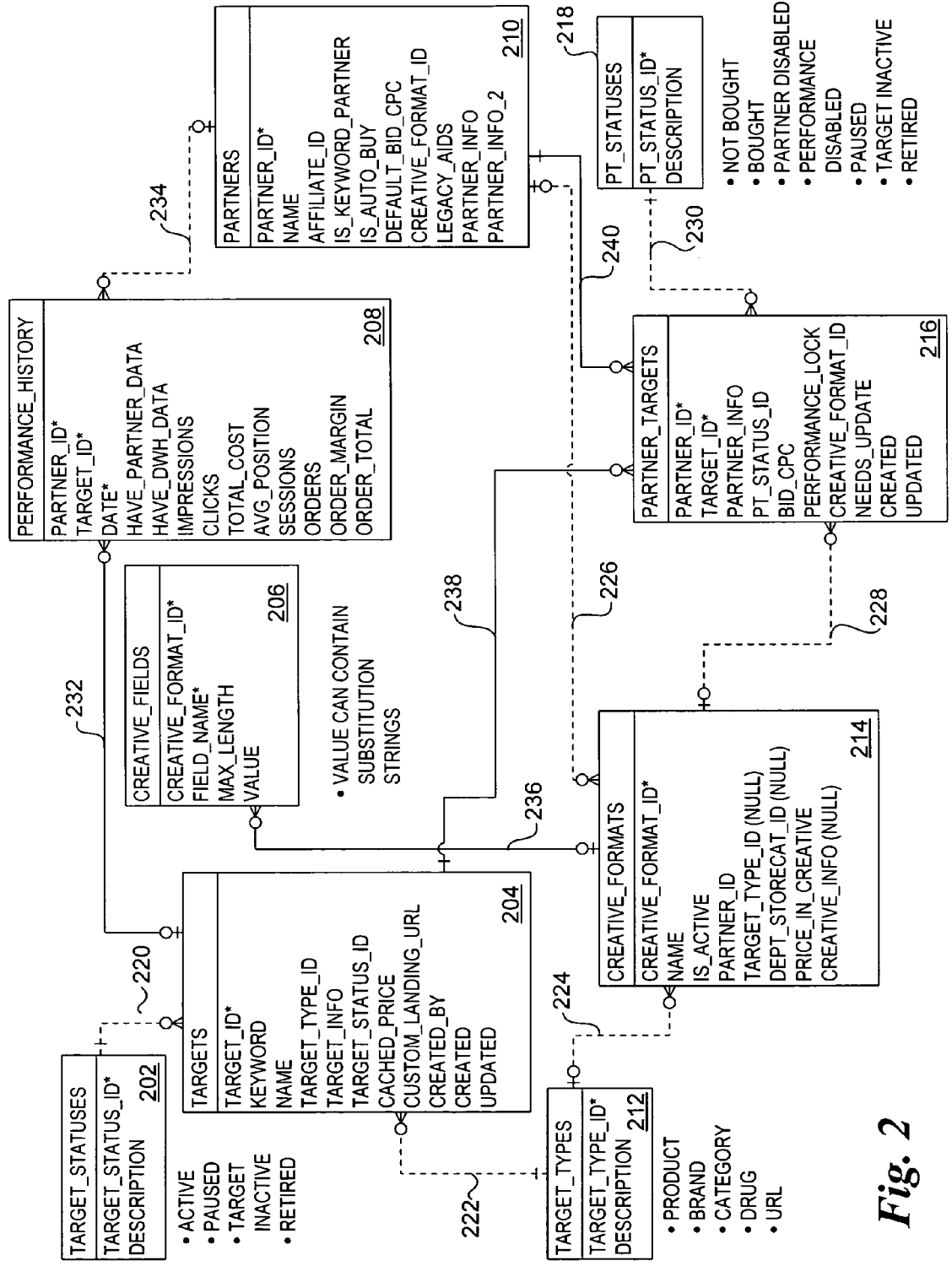
FIG. 2 is a schematic diagram of a database schema used for the external search database in FIG. 1, according to one embodiment of the invention.

XS database 100 stores various data used by the architecture. These data include target objects 114, targets 116, partner-targets 118, and performance history 120. Details of the tables and attributes corresponding to an exemplary schema for central XS database 100 are shown in FIG. 2.

Catalog database 102 stores information contained in an electronic catalog that lists items offered for sale by the storefront site. A portion of the data stored in catalog database 102 is logically represented as products 122, brands 124, categories 126, and drugs 128. It will be understood that these are merely exemplary types of objects that may be searched for via an electronic storefront.

Data warehouse 104 is used to store historical records. Typically, transactional records corresponding to customer session activities, including purchases, historical product and pricing data, and other data commonly stored by electronic storefront sites in their data warehouses will be stored in this database.

API 106 provides an abstracted interface between XS database 100 and each of Chron jobs 108 and web site 110. In one embodiment, API 106 is implemented via visual basic (VB) scripts 130. Other types of database interlaces may also be employed, including but not limited to a conventional programming language (e.g., C, C++, etc.), another scripting language (e.g., javascript), or a database application language, such as PL/SQL for databases produced by the Oracle Corporation of Redwood City Calif.

Chron jobs 108 comprise a set of activities that are performed on a periodic basis, such as once a day. These include target discovery 300, target management 400, partner-target management 500, partner export 600, partner reporting 700, data warehouse (DWH) reporting 800, and performance management 900. In one embodiment, Chron jobs 108 are performed with respective daemons, as described below in further detail.

Web site 110 provides a web-based front-end interface to administrators managing the storefront business. The activities pertinent to this disclosure will generally be hosted by a web site that is separate from the web site that is used to host the online-store (to Internet users), although the same site could be used. In one embodiment, web site 110 is an ASP- (active server pages) based Web site.

Details of an exemplary RDBMS (Relational Database Management System) database schema 200 that is used for XS database in one embodiment are shown in FIG. 2. The tables includes a TARGET_STATUSES table 202, a TARGETS_TABLE 204, a CREATIVE_FIELDS table 206, a PERFORMANCE_HISTORY table 208, a PARTNERS table 210, a TARGET_TYPES table 212, a CREATIVE_FORMATS table 214, a PARTNER_TARGETS table 216, and a PARTNER_STATUSES table 218. Primary keys for each table are indicated with a "*". Each of tables 202, 204, 210, 212, 214, and 218 include a single primary key identifier (ID) indicative of that table's content; for example, the primary key of TARGETS table 204 is TARGET_ID. Tables 206, 208, and 216 have complex primary keys.

The non-identifying one-to-many relationships (shown in dashed lines) include a one-to-many relationships 220 (via TARGET_STATUS_ID), 222 (via TARGET_TYPE_ID), a one-to-many relationship 224 (via TARGET_TYPE_ID), 226 (via PARTNER_ID), 228 (via CREATIVE_FORMAT_ID), and 230 (via PT_STATUS_ID). The identifying one-to-many relationships (shown in solid lines) include relationships 232 (via TARGET_ID), 234 (via PARTNER_ID), 236 (via CREATIVE_FORMAT_ID), 238 (via TARGET_ID), and 240 (via PARTNER_ID). Further details of the table attributes (columns) are discussed below in their respective system use context.

One of the more important aspects described herein is target discovery. Overall, the purpose of target discovery is to discover targets that are used for subsequent purchases of keywords from the search partners. Recall that a target comprises the combination of a keyword and a target object; while a target object corresponds to one of a product, brand, category, drug, search or custom link. One goal is to identify keywords (single words or phrases) that, when used in a search, will produce search results containing links to corresponding target objects, such as items found in an electronic storefront's catalog, and thus offered for sale by the storefront.

In one embodiment, target discovery, as well as the other Chron jobs 108, are performed on a periodic basis. Although an ordering of jobs is shown in FIG. 1, this is merely for illustrative purposes. Generally, Chron jobs 108 may be performed in sequence, or may be performed asynchronously.

Figure 3A:
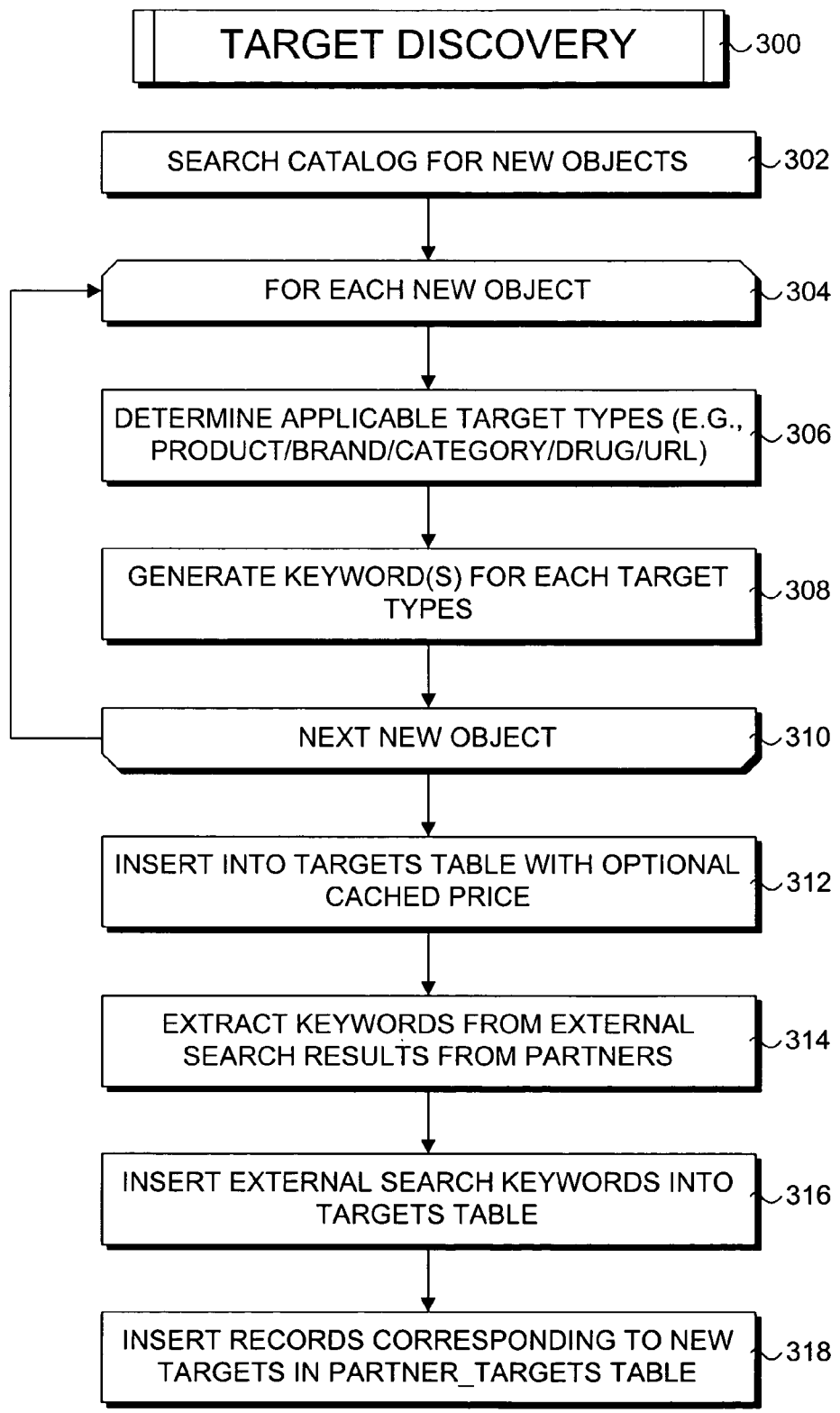
FIG. 3a is a flowchart illustrating operations performed during a target discovery process, according to one embodiment of the invention.
Figure 3B:
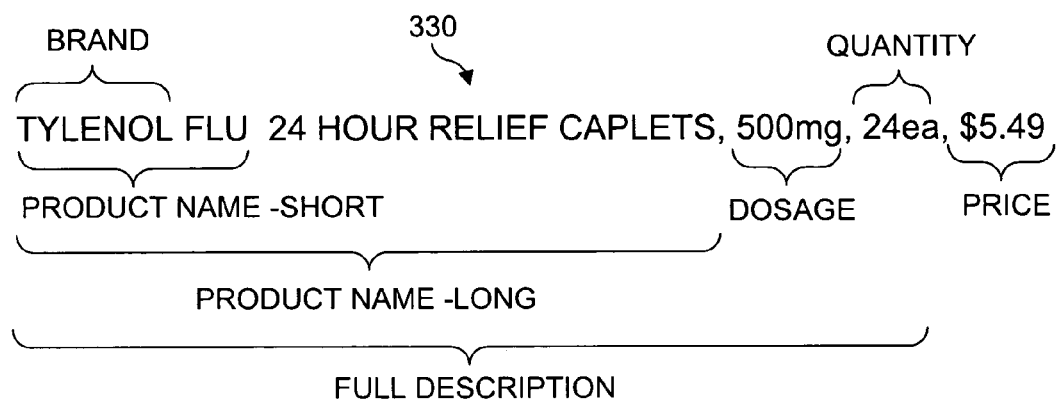
FIG. 3b illustrates various description levels according to an exemplary catalog item.

Details of operations performed during target discovery 300 in accordance with one embodiment are shown in FIG. 3. The process begins in a block 302, wherein the electronic catalog generated by the storefront is searched to identify new objects for which keyword-based search results are to be targeted (i.e., items that have been added to the catalog since the last target discovery and any existing items that have not been considered for target discovery). In one embodiment, objects in catalog database 102 including products 122, brands 124, categories 126 and drugs 128 are marked with a Boolean value that indicates whether or not target discovery has considered the objects.

The next set of operations are performed for each new object (and previously unconsidered objects), as delineated by start and end loop blocks 304 and 310. In a block 306, applicable target types for the object are determined, while in a block 308 keywords and/or phrases are generated for each target type. For example, consider a catalog item 330 shown in FIG. 3b. In one embodiment, the catalog entry is broken down into several components, including a brand, a short product name, a long product name, a full description, dosage, quantity, and price. Based on the various components, product-based keywords and/or phrases are generated in a block 308. For example, the product-based keywords might include the long and/or short product names shown in FIG. 3b. Similarly, brand- category- and/or drug-based keywords and phrases may be generated in a block 308, as applicable. For example, a brand-based keyword for catalog item 330 might be "Tylenol." A category-based keywords might include "cold", "flu", "cold relief" or "flu relief", "fever reducer", "cough suppressant", "nasal decongestant," etc. Drug-based keywords are generally applicable for catalog items referenced by their drug name or chemical formula. These may include a tradename (e.g., Prozac), and/or chemical formulas for the drug (e.g., Flouxetine HCL for Prozac).

In addition to the product, brand, category, etc. information, the keywords may include common misspellings, synonyms, and/or other information that might be entered in a search to return a link to a corresponding target object. For example, the product Strivectin is an over-the-counter alternative to Botox. Thus, keywords for Strivectin might include the correctly-spelled name, along with misspellings such as Strivecten, and optional search criteria, such a "Botox Alternative", or simply "Botox." In this latter instance, the idea is to return a search result identifying a product that might be of interest to someone interested in Botox treatments.

After the keywords/phrases are generated for the new catalog items, corresponding data are inserted into TARGETS table 204. For example, the keyword or phrase is stored in the KEYWORD column, while the target name is stored in the NAME column. The TARGET_TYPE_ID column contains a code for the target type, i.e., product, brand, category, drug, or URL (described below). A target status of ACTIVE is entered via an appropriate code for the TARGET_STATUS_ID. Information about the target is stored in the TARGET_INFO column. This information may include identifiers such as the product ID (PID), the brand ID (BID), the category ID (CID), etc.

The CUSTOM_LANDING_URL column allows marketers to override the default storefront URL that is used for the target. For example, if a product is part of a special promotion, a CUSTOM_LANDING_URL may be employed that includes links to that product's keywords to go to a page containing information about the promotion.

Optional information identifying the user who created the record (the target discovery daemon in this case) is stored in the CREATED_BY column. The CREATED and UPDATED columns are used to store time and date information (e.g., SYSDATE) corresponding to when a TARGET was created and last updated.

The optional CACHED_PRICE value corresponds to a cached price for an object for which the keyword is generated. In addition to individual products, cache prices may apply to brands and drugs, as appropriate. For example, because the price of a target object may be incorporated into the marketing message used at the partner, a mechanism is required to track changes in that price so that partner updates can be triggered. A CACHED_PRICE field value is only relevant for target object types that make sense; a category containing hundreds of individually-priced SKUs does not have a single price. However, by convention it may be useful to specify the CACHED_PRICE of a category to be the minimum price of all products to support messaging such as "humidifiers starting at $15".

Figure 3C:
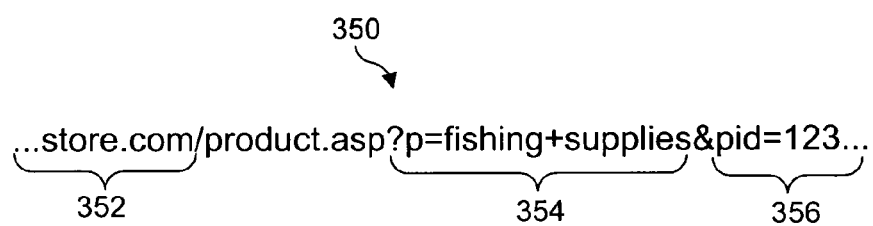
FIG. 3c illustrates an exemplary URL produced by a search partner containing a search term used to retrieve web page associated with a catalog item offered for sale by an electronic storefront.

Another aspect of target discovery relates to keywords and/or phrases that produce search results generated by partner search engines that contain information related to target objects. The objective in this instance is to identify keywords that may or may not be easily recognized as appropriate for a particular product, brand, etc., yet were used as keywords or phrases on a partners search site to produce a search result referencing the product, brand, etc. In one embodiment, this information is initially generated by the search engine partner, and provided to the storefront in the form of a URL. For example, an exemplary portion of such a URL 350 is shown in FIG. 3c. The first part 352 of the URL identifies the storefront. A second part 354 indicates what the search term or terms used to return the related result. In the illustrated example, the search term was fishing+supplies. A third part of URL 350 identifies which target object the hit is for. In addition to the illustrated components shown, the URL may contain information about categories, and other search indicia.

As discussed below, various keyword purchase data are exported to each search partner, wherein the data include destination links to target objects containing embedded information identifying various attributes of the objects, such as product_IDs and brand_IDs. The routing portion of the link will link to a particular Web page. Since the Web page will be spidered in many instances, the search partner may index the page separately (i.e., outside of the context of using paid search keywords for the site). Thus, a URL to a target object may be returned in the context of a non-paid (from the storefront's perspective) search result in response to various search terms. These search terms may be internally generated by the search partner using natural search algorithms and the like, or they may result from search terms entered by search partner users. Under another scheme, the search partner may identify search terms used by other keyword buyers that are used to link to content on the other buyer's site that is similar to content on the storefront's site.

In accordance with the foregoing discussion of search partner URLs returned to the storefront, keywords are extracted from such URLs in block 314. The extracted external search keywords are then inserted into targets table 204 in block 316. Corresponding records for new targets are then inserted into PARTNER_TARGETS table 216 in a block 318, completing the target discovery process. The partner target status (PT_STATUS_ID) for each new target record is then marked as NOT BOUGHT via entry of an appropriate code as defined in PT_STATUSES table 218, and the NEEDS_UPDATE value is set to indicate the new record is to be processed during partner target management operations.

Figure 4:
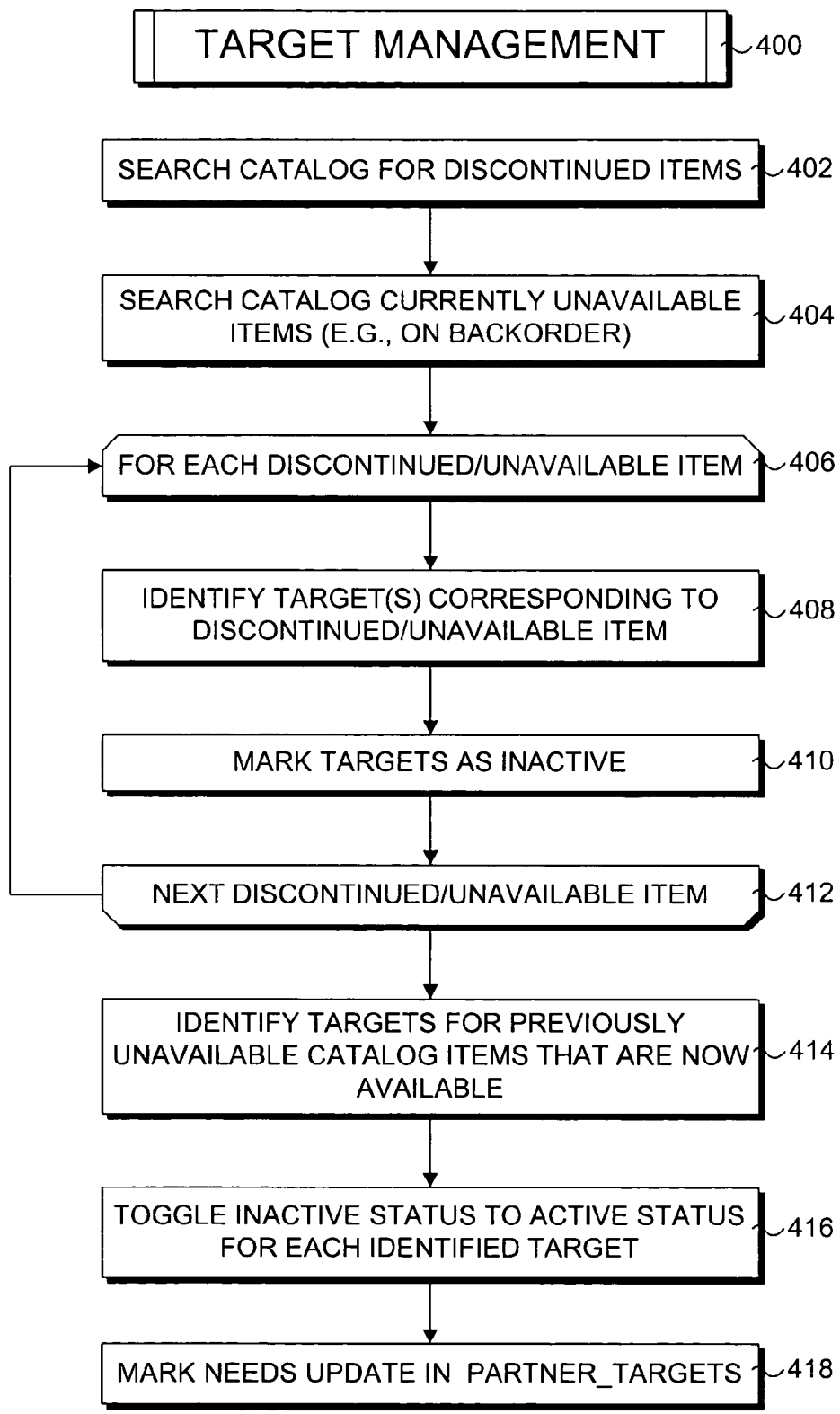
FIG. 4 is a flowchart illustrating operations performed during a target management process, according to one embodiment of the invention.

Details of operations performed during target management 400 are shown in FIG. 4. The overall objective of target management is to deactivate targets corresponding to discontinued or currently unavailable catalog items, and reactivate targets corresponding to previously unavailable catalog items that are now available. The reason for this is that in one embodiment it is generally preferred to not direct potential customs to the storefront who may be interested in discontinued or unavailable items; thus, the keywords for these items are effectively deactivated at the search partners during partner-target management, as described below.

The process begins in a block 402, wherein the catalog is searched for discontinued items. For example, various products may be discontinued by a supplier or otherwise will not be available for an indeterminate period of time. In a block 404, the catalog is searched for items that are currently unavailable, such as items that are on backorder. In some instances, suppliers provide products in a cyclical manner, wherein a product might be available for a month or two, and then unavailable until the next cyclical shipment is received.

Next, the operations delineated by start and end loop blocks 406 and 412 are performed for each discontinued or unavailable item. In a block 408, targets corresponding to the discontinued and unavailable items are identified. In one embodiment, a catalog item can be uniquely identified by the combination of the TARGET_TYPE_ID and TARGET_INFO data stored in TARGETS table 204. At the same time, information is maintained in CATALOG database 102 indicating the status of each catalog item. Accordingly, a query can be made using TARGETS table 204 and one or more tables in CATALOG database 102 maintaining the applicable catalog item data (not shown), to identify which targets are affected. Those targets are then marked as inactive in a block 410 by setting the TARGET_STATUS_ID to the code corresponding to the TARGET INACTIVE status (as defined in TARGET_STATUSES table 202).

The next operations pertain to targets that need to be reactivated—that is, returned from an inactive status to an active status. In a block 414, targets corresponding to the catalog items that were previously unavailable but are now available are identified. This operation is performed in a manner similar to block 408 above, except in this instance the query includes tables in catalog database 102 containing data that indicates that a catalog item is now available. The inactive status for those targets is then updated to an active status (via a change in each target's TARGET_STATUS_ID) in a block 416. Any rows in PARTNER_TARGETS 216 that need to be re-bought are flagged accordingly. The target management operations are completed in a block 418, wherein the targets to be deactivated or reactivated that are in PARTNER_TARGETS table 216 are marked as needed to be updated by toggling the corresponding value in the NEEDS_UPDATE column.

Partner target management 500 relates to activities employed for management of targets for each search partner. Generally, each search partner will have particular mechanisms for managing targets. The mechanisms cover how keywords are imported, how keywords are bought, how keyword statuses are identified, how keyword information is formatted, etc. In some cases, the same set of keywords will be managed for each search partner. In other cases, individual sets of keywords will be managed at respective search partners.

Figure 5A:
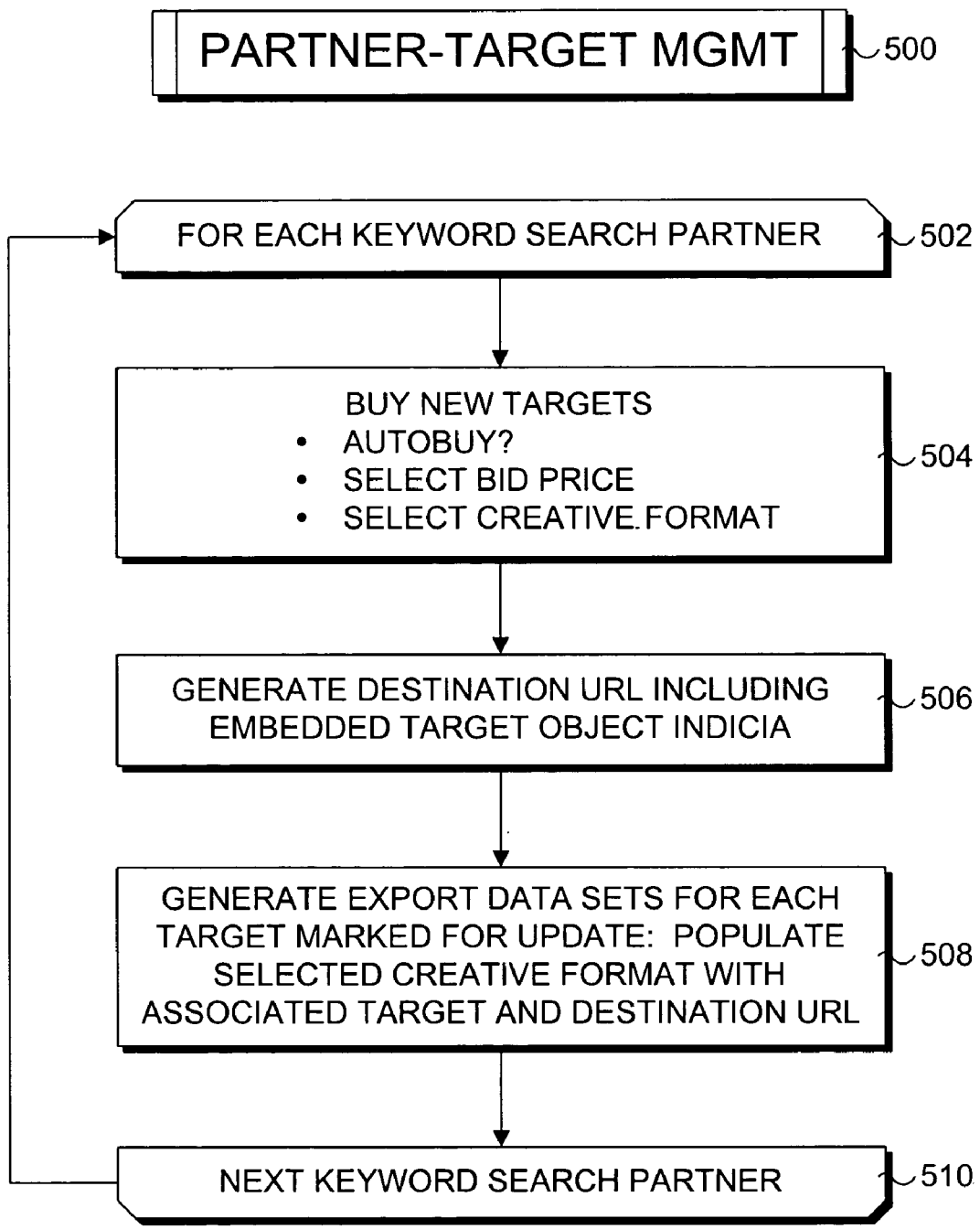
FIG. 5a is a flowchart illustrating operations performed during a partner-target management process, according to one embodiment of the invention.

With reference to the flowchart of FIG. 5a, partner-target management operations proceed as follows. As delineated by start and end loops blocks 502, the operations in blocks 504, 506, and 508 are performed for each keyword search partner. Keyword search partners may be identified based on the value of the IS_KEYWORD_PARTNER attribute in the PARTNERS table 210. The first operation for each identified keyword search partner is to buy new targets, as depicted in block 504. This target purchase process begins by querying PARTNERS table 210 with the PARTNER_ID corresponding to the keyword partner who is currently being processed to determine whether an arrangement has been made with that partner to automatically buy targets, as indicated by the IS_AUTO_BUY attribute. If so, a bid price is determined. In one embodiment, the bid price is set in accordance with a default bid price, as defined by the value in the DEFAULT_BID_CPC column of the PARTNERS table for the current search partner. In general, the bid price for a given keyword will be considered by the partner in view of other bid prices for the same keyword when the search results list is ordered (or the search add arrangement is generated, as discussed above. Periodically, the search partner will provide keyword billing data that includes result rankings. In response to the rankings, the bid price for a given keyword may be adjusted to enhance the cost effectiveness of the keyword, as discussed below.

Another aspect of buying new targets concerns picking a creative format. Generally, creative formats comprise templates that are used to format search results. They can be configured to be specific to products, categories, stores, etc. They also may be partner-specific. For example, creative formats 550B, 550C, 550D, 550E, 550F and 550G are shown in FIGS. 5B-G, respectively. Creative format 550B corresponds to a format used for a beauty store (with a displayed storefront URL of www.beauty.com) for a particular type of product. Each of creative formats 550C and 550D correspond to the same storefront (Drugstore.com®), but have different display URLs (respectively www.sexual-well-being.com and www.drugstore.com), and correspond to respective category types. This is illustrative of how products having different categories may use different creative formats. Creative format 550E corresponds to a brand-specific creative format for the beauty store. Creative format 550F corresponds to a product-specific (Stivectin) creative format. Creative format 550G corresponds to a default format for a particular search partner.

Each row in a creative format template 550 comprises a triple including a field 552, a maximum length 554, and a value 556. The various values for the respective fields are placed in the corresponding fields defined by search result templates for each search partner. Since each search partner's result template is typically defined to restrict the length of each field to a specified limit, a corresponding maximum length value is included for each field in the creative format. The fields 552 will typically include one or more description lines 558, a display URL 560, a primary headline 562, and one or more secondary headlines 564.

The next operation performed in block 506 is to generate the destination URL, i.e., the linking mechanism to the target object. The destination URL will typically include embedded object indicia that is applicable for the target object, such as PIDs and BIDs.

After the destination URL is generated, an export data set for each partner target that needs updating is generated in a block 508. Upon completion, each set of export data defines a formatted search result, which is generated by populating appropriate fields in the creative template applicable to the target. This comprises iterating through the rows in PARTNER_TARGETS table 216 for which the NEEDS_UPDATE column value is set, populating the selected creative format with the associated data for the partner target, including the destination URL. In addition, a keyword bid price and keyword will be included in each export data set. In some instances, the cached price is also retrieved under circumstances for which a price may be specified, such as for creative formats 550C and 550D.

Figure 6A:
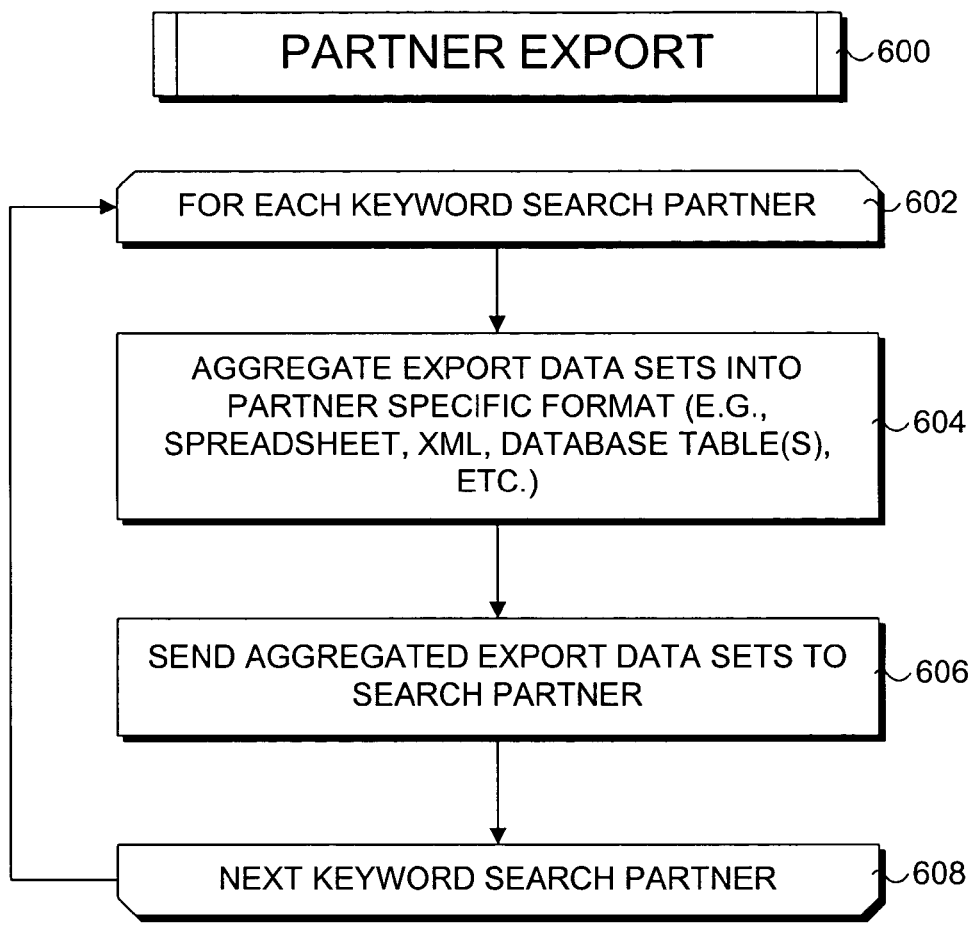
FIG. 6a is a flowchart illustrating operations performed during a partner export process involving a bulk data transfer, according to one embodiment of the invention.
Figure 6B:
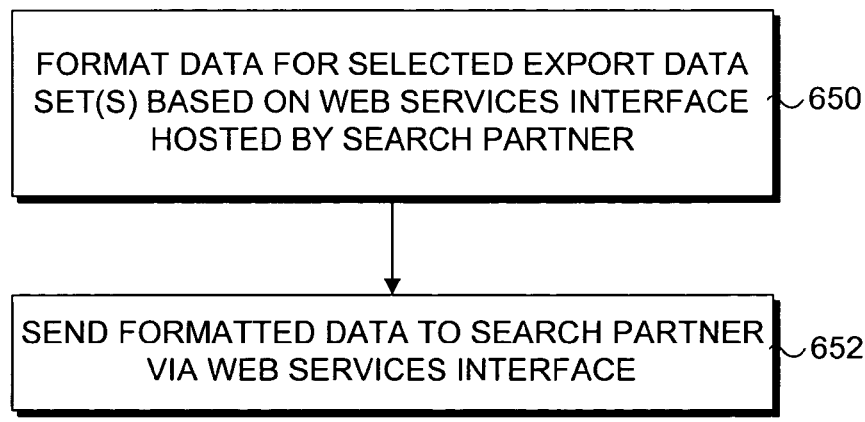
FIG. 6b is a flowchart illustrating operations performed during a partner export process involving individual keyword management via a Web service, according to one embodiment of the invention.
Figure 10:
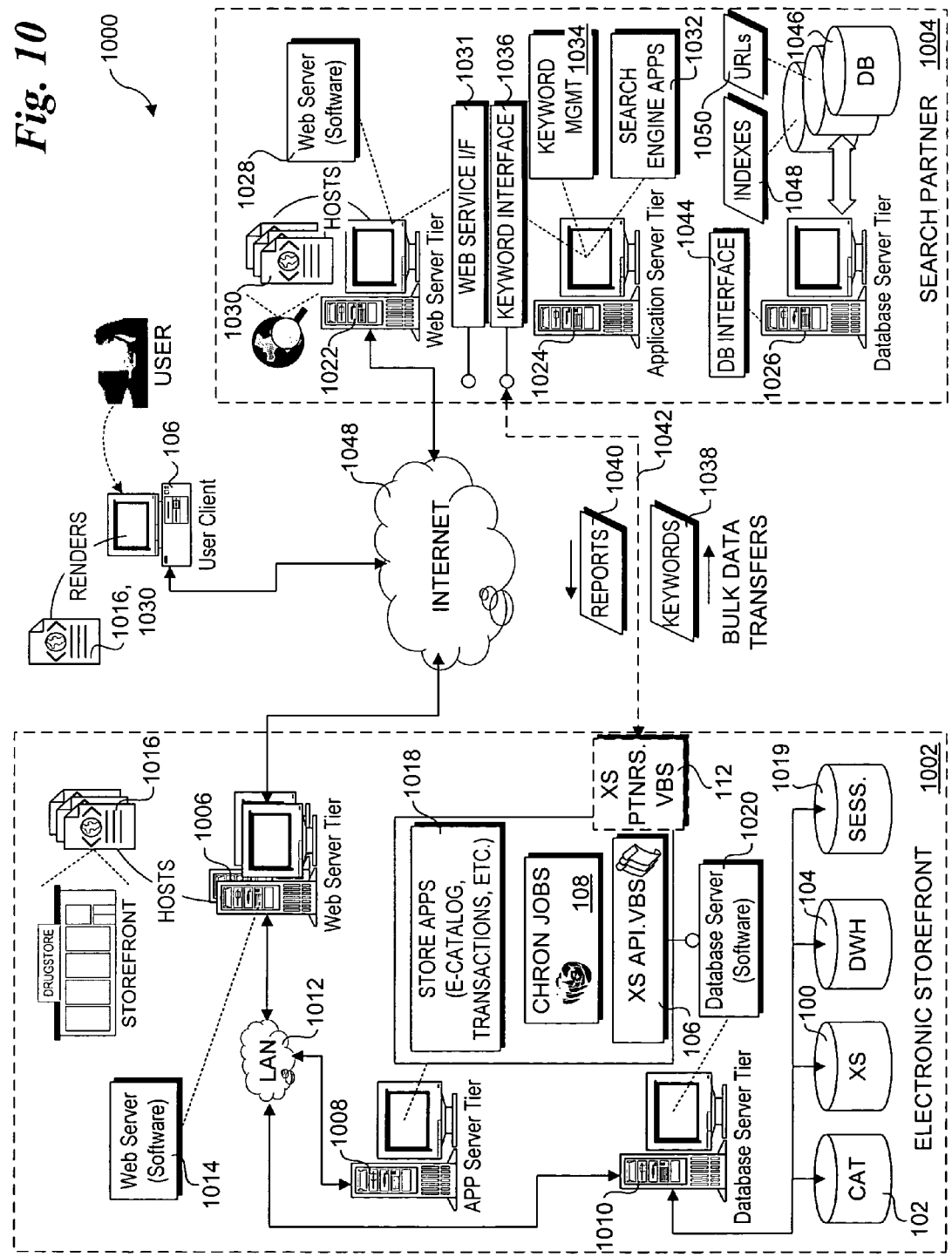
FIG. 10 is a schematic diagram illustrating an architecture for practicing the invention, according to one embodiment of the invention.

Once generated, the partner target export data is exported to the search partner during partner export 600 using a partner-specific export mechanism, as depicted by start and end loop blocks 602 and 608 in FIG. 6a. In a block 604 the export data sets are aggregated into a format specified by the search partner. For example, one partner may want to import data using XML (extensible markup language), while another partner may request database tables, spreadsheets, comma delimited files, etc. The delivery mechanism may also be partner specific. For instance, XML documents may be transmitted via the Internet using a web front-end, while spreadsheets and comma delimited files may be attached to e-mail. Database table data may be delivered as an attached dump, or may be performed via a remote database link. For example, Oracle databases may be configured to transfer table data between database instances located at sites that are remote from one another. In one embodiment, XML documents and the like may be transmitted via a dedicated link, such as the dedicated link 1042 shown in FIG. 10 and discussed below. In general, the particular export/import mechanism is not important, but is agreed upon with the partner to ensure the data received by the search partner is properly understood.

Figure 7A:
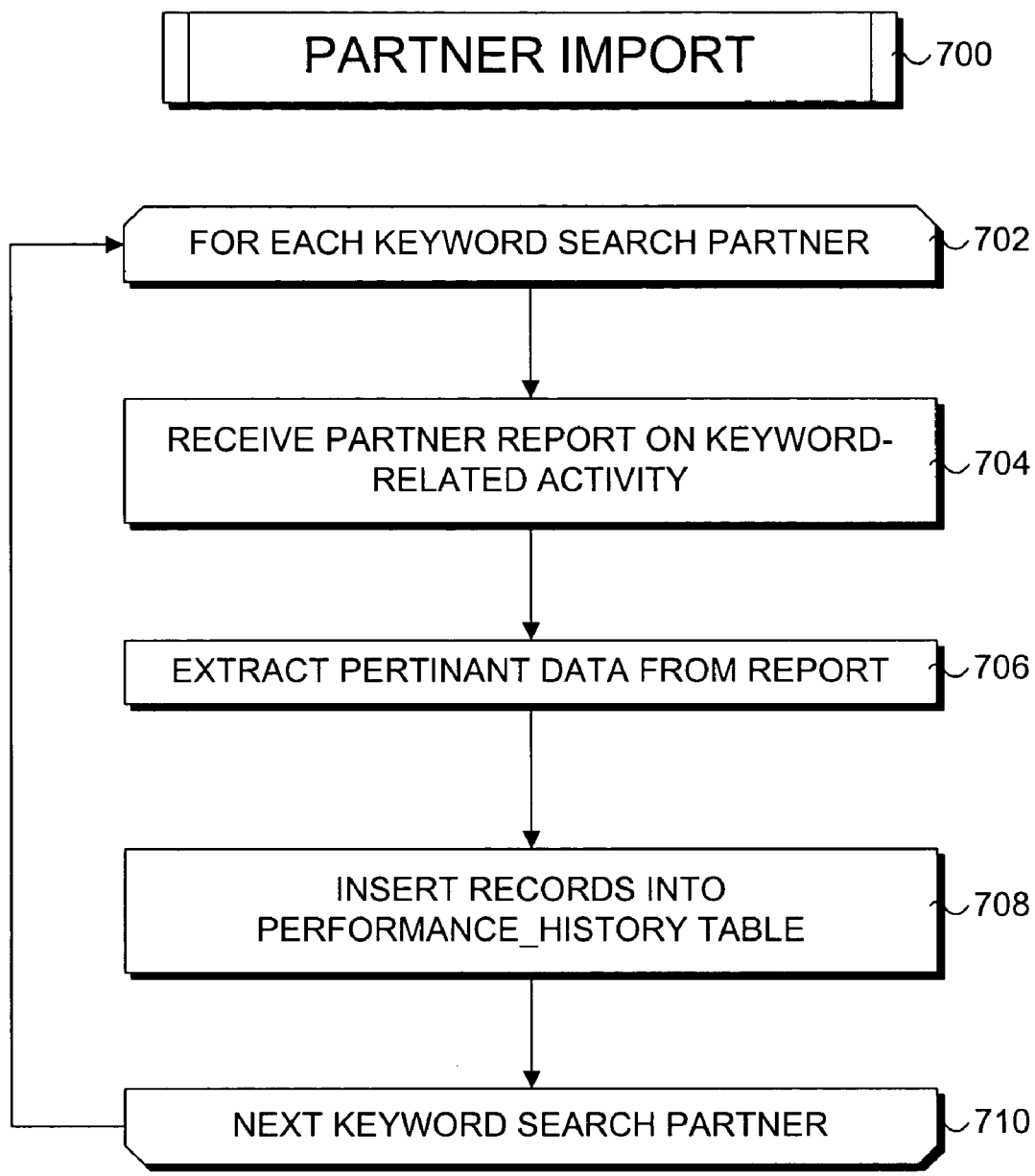
FIG. 7a is a flowchart illustrating operations performed during a partner import process, according to one embodiment of the invention.

Another aspect of one embodiment relates to processing respective target activity reports generated by the various search partners. The first portion of this processing falls under partner import 700, details of which are shown in FIG. 7a. As with partner exports, partner imports are performed for each partner, as depicted by start and end loop blocks 702 and 710, and are generally partner-specific. Typically, partner import 700 activities will be performed on a periodic basis, although the period may differ from those used in other storefront-side activities since they are driven by the reporting frequency of each search partner.

The process for a given partner begins in a block 704, in which a partner report on keyword-related activities is received. In a companion activity in a block 706, pertinent data are extracted from the report. Typically, the report produced by each search partner will include attributes particular to that search partner. Accordingly, respective partner import modules are used for those partner-specific reports. Other report partners may use a standardized report designed by the storefront.

Attributes and exemplary values corresponding to a typical partner report are shown in FIG. 7b. Generally, the partner report will be provided in some type of tabular format, such as via a spreadsheet, one or more database tables, a comma or space delimited text file, etc. The attributes (i.e., columns) of the tabular format pertain to types of data that are recorded by the search partner for keyword reporting purposes, and generally include keyword activity and billing data. In the exemplary format of FIG. 7b, the attributes include a report Date, Campaign, Ad Group, Keyword, Keyword Status, Headline, Description Lines 1 and 2, Display URL, Destination URL, Maximum CPC, Impressions, Clicks, Cost, and Average Position.

The report Date attribute indicates the date for the report. In instances in which a report is made periodically, such as once a day, the report Date effectively identifies the report period. For non-periodic reports (or non-daily reports), the report Date attribute will typically be replaced with report period information.

In the illustrated embodiment, the Campaign and Ad Group attributes relate to an advertisement campaign. Typically, one or more campaigns may be going on concurrently. For tracking purposes, it may be desired to evaluate marketing efforts based on some logical divisor, such as by store (when a storefront hosts multiple stores), categories, product types, etc. The Ad Group attribute provides for performance tracking at the ad group level.

Some of the attributes shown in the illustrated report example are employed internally by the partner, but are ignored during report processing. These attributes include the Keyword and Keyword Status attributes. Additional attributes that may be ignored include the Headline, Description Line 1, and Description Line 2 attributes, which are generally illustrative of attributes that may appear in the result listing for a keyword hit.

The Display URL is the URL that is displayed in the search result. The Destination URL is the actual URL that is used to link the user to the target object at the storefront's site. As discussed above, URLs may include various embedded information that is ancillary to the page navigation definition in the URL. For example, the Destination URL may include a promotion code, and various parameters.

The next set of attributes relate to cost and keyword activity. The Maximum CPC value represents the maximum cost per click that was billed during the currently reporting period. The Impressions attribute value reflects the number of times the keyword-related search result was presented to a user (i.e., rendered on a user's browser). The Clicks attribute value identifies the number of times a user actually clicked the search result (or embedded link) and was redirected to the Destination URL in the result. The Cost attribute reflects the total cost charged for click-through activities. This may typically be in the form of an overall cost or average CPC.

The Average Position attribute identifies the average position of the storefront-linked results that are returned for the keyword relative to other results and/or advertisements, as applicable. This information may be used to help determine if a keyword-based results are appearing high enough in the results lists. Generally, the lower the number, the higher placement of the keyword-based result in the results list.

Also in connection with the operations of blocks 704 and 706, the extracted data is processed, as appropriate, and inserted into the PERFORMANCE_HISTORY table 208 in a block 708. Each report row will contain sufficient data to link the data in that row to existing data stored in XS database 100. That related information, in combination with raw report data (typically), is then inserted into new rows in PERFORMANCE_HISTORY table 208. For example, the exemplary partner report format of FIG. 7b includes the Keyword Attribute, and is submitted by a particular partner (which may be identified by the report header or similar indicia). Thus, the PARTNER_ID (from the report source) and TARGET_ID (from TARGETS table 204 based on the keyword) for each row's data may be easily determined.

As shown, the complex key of PERFORMANCE_HISTORY table 208 comprises the combination of PARTNER_ID, TARGET_ID, and THE_DATE (i.e., the report Date), all of which can be derived from the processing of each row in the partner reports. The HAVE_PARTNER_DATA and HAVE_DWH_DATA attributes are used to reflect the progress of a two-phase insertion progress, wherein the first phase corresponds to insertion of partner report data, and the second phase corresponds to insertion of data warehouse data, as discussed below for DWH reporting 800. These are Boolean attributes, with a '0' representing yet to be performed, and a '1' indicating the operation has been performed, according to one embodiment. In most instances, the values for the IMPRESSIONS, CLICKS, TOTAL_COST, and AVG_POSITION attributes may be derived directly from corresponding columns in the partner report. Of these attributes, the more important attribute values are the CLICKS and TOTAL_COST values, since they will be used during Performance Management 900 to determined the CPC values.

Figure 8A:
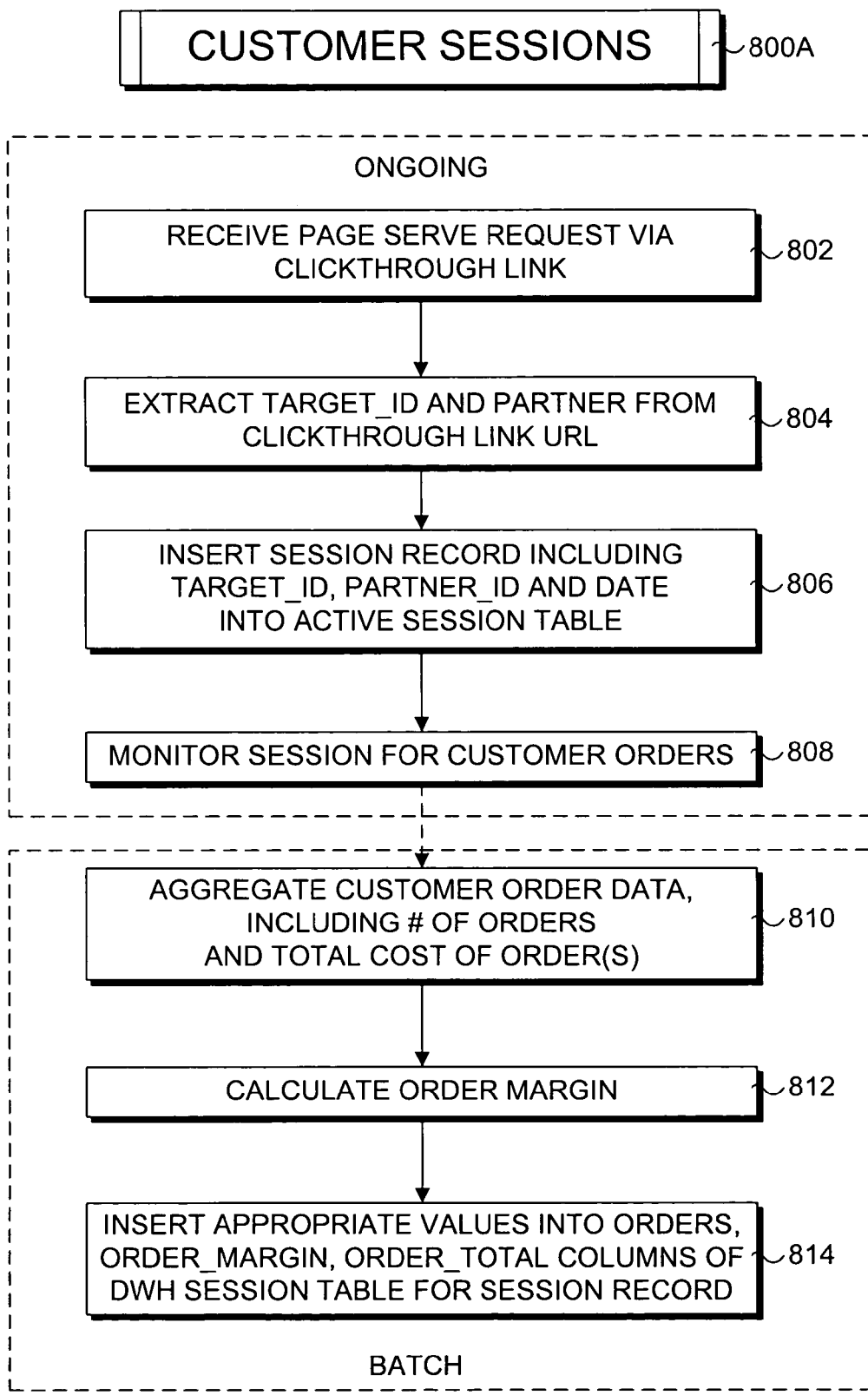
FIG. 8a is a flowchart illustrating operations performed during customer sessions, according to one embodiment of the invention.

The DHW reporting 800 operations are performed on data that are already present in DWH database 104. In order to better understand how the data are generated, reference is made to the flowchart of FIG. 8a, which depicts operations corresponding to customer session operations 800A. In general, the operations shown in FIG. 8a correspond to ongoing operations that are performed continuously by the storefront during customer sessions.

A typical keyword-initiated customer session begins in a block 802, wherein a web page serve request is received via a clickthrough link contained in a search result that is activated by a user. In a block 804, the TARGET_ID and partner indicia are extracted from the clickthough link. For example, the aparam parameter in the Destination URL of FIG. 7b corresponds to a TARGET_ID for the keyword "strivectin sd." The partner can be identified via one of several mechanism, including embedding information in the Destination URL originally sent to the search partner that identifies the search partner, or having the search partner append (or otherwise embed) partner indicia in the actual destination URL that is used in for the link.

Next, in a block 806, a session record is inserted into an active session table. Typically, contemporaneous information will be stored in a database that is separate from DWH database 104; this database is not shown in FIG. 1 for simplicity, but will be readily recognized by those skilled in the art as existing in the typical electronic storefront architecture. The data depicted as being inserted into or retrieved from the active session table may be stored in a single table, or may be stored in multiple tables that are linked via appropriate foreign key-to-primary key references. Each session record will include respective values corresponding to the TARGET_ID, PARTNER_ID, and DATE of the clickthrough link. Optionally, the date and the Destination URL (or portion of the Destination URL containing indicia from which the TARGET_ID and PARTNER_ID may be identified) may be stored in the active session table.

In accordance with a block 808, the customer session is monitored for customer order activity. Monitoring operations of this type are well-known in the art, so no further details are provided herein. In response to the customer order activity (if any), customer order data, and a total cost of the order(s) are aggregated in a block 810.

In a block 812, the aggregated data are processed to calculate an order (profit) margin. In one embodiment, the order margin is calculated as:

(revenue from products−cost of products)+(revenue from shipping−cost of shipping)−average variable costs per order(labor, etc.)

In one embodiment the variable cost is an average based on recent history and is stored as a constant in a BATCH_STATE table (not shown in FIG. 2), which is used for batch processing.

The cycle is completed in a block 814, wherein appropriate values for the ORDERS, ORDER_MARGIN, and ORDER_TOTAL columns are inserted into a DWH session table for the session record. Typically, data is moved from an active session database to a data warehouse on a periodic basis, such as once a day, once a week, etc. This is for various reasons, including reducing the size of the active session database, for performance reasons, and for maintaining a historical record of customer session activity. As a result, the operation of block 814 may be performed periodically using a bulk insert, or may be performed in connection with the completion of a customer session on an individual record basis.

Typically, the operations for blocks 810, 812, and 814 may be performed using session data that is copied to the data warehouse database 104. For example, recent customer session data is periodically copied (or moved) to data warehouse database 104. A batch process may then be performed to effectuate the operations of blocks 810, 812, and 814 using appropriate queries on the tables in data warehouse database 104.

Figure 8B:
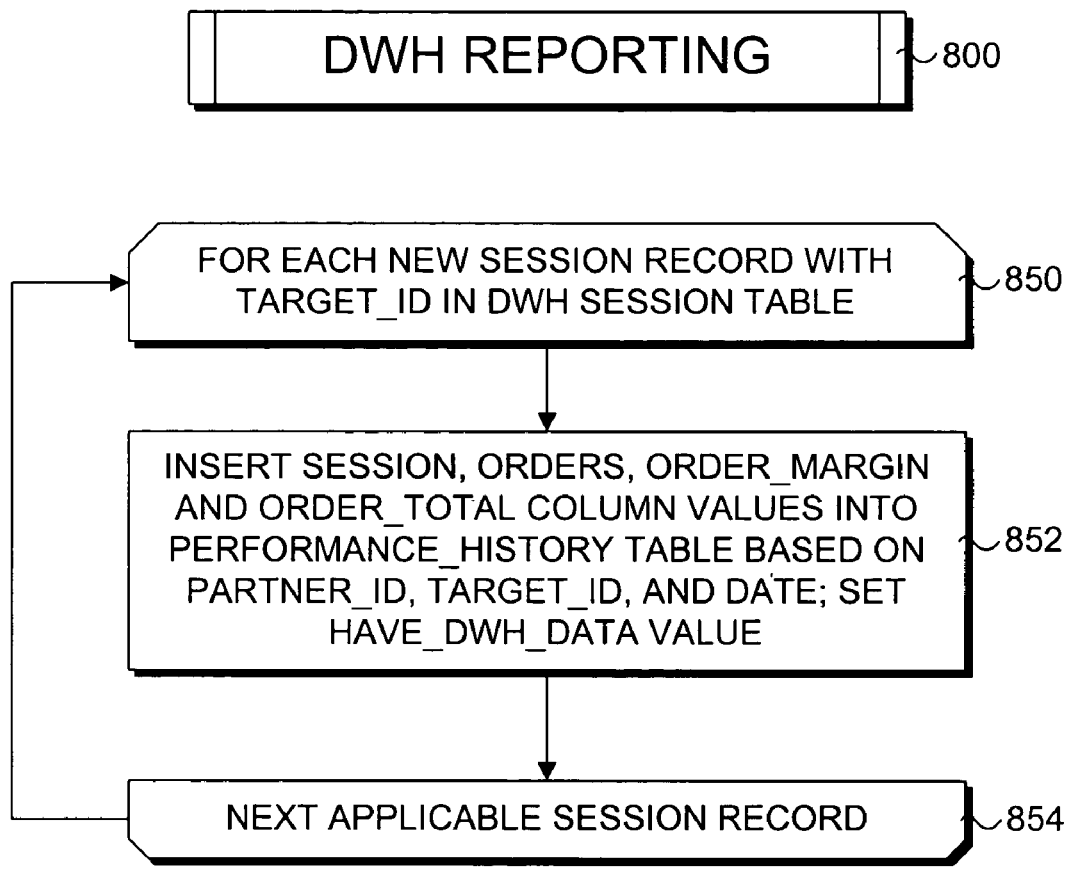
FIG. 8b is a flowchart illustrating operations performed a during data warehouse reporting process, according to one embodiment of the invention.

The other half of the DHW operations correspond to DWH reporting 800. During DWH reporting, data stored in DWH session table of DWH database 104 in inserted into PERFORMANCE_HISTORY table 208 in a manner that fills in the SESSIONS, ORDERS, ORDER_MARGIN and ORDER_TOTAL columns of the existing records that were inserted during the partner import operations. As shown by start and end block 850 and 854 in FIG. 8b, the operation shown in a block 852 is performed for each new session record with a TARGET_ID value in the DWH session table. In one embodiment, the DWH session table will contain information pertaining to sessions that were not initiated via a clickthrough link, in addition to those session that were. The existence of a TARGET_ID value will indicate whether or not a session was initiated via a clickthrough link. Furthermore, new session records may generally be identified based on the date information for each record, or a column may be provided to indicate which records have already been processed during previous DWH reporting activities.

In block 852, values for the SESSION, ORDERS, ORDER_MARGIN, and ORDER_TOTAL columns are added to PERFORMANCE_HISTORY table 208 using an update query linking the PERFORMANCE_HISTORY table with the DWH sessions table on the PARTNER_ID, TARGET_ID, and DATE columns. In a similar manner to that discussed above for the active sessions table, the data in the DWH sessions table may actually be contained in multiple linked tables. Accordingly, there may not be a direct one-to-one correspondence with each of the PARTNER_ID, TARGET_ID, and DATE columns, but rather such relationships may be derived via appropriate links. In connection with each row that is updated, the HAVE_DWH_DATA value is set to indicate the DWH database 104 data have been added.

Figure 9:
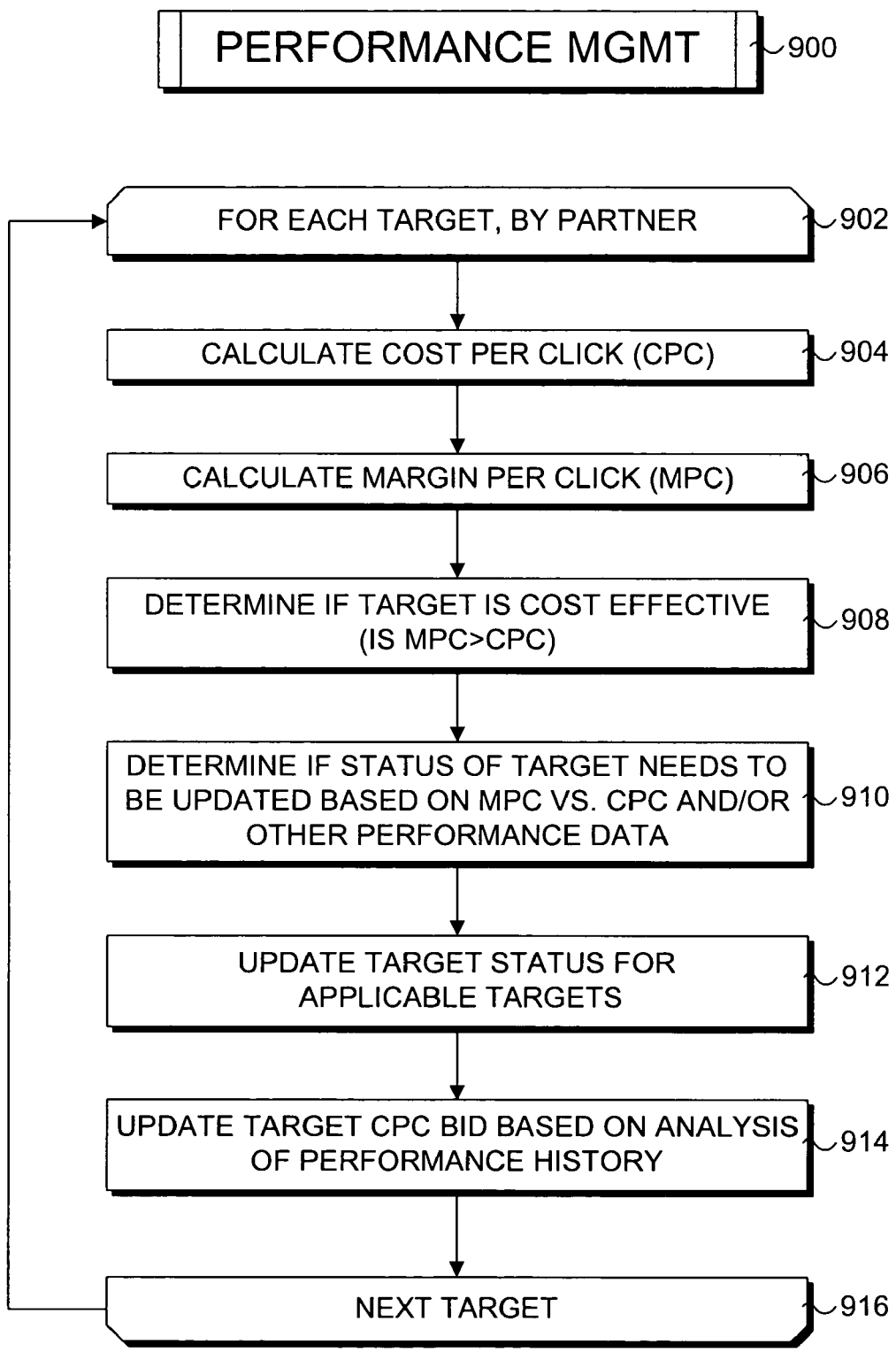
FIG. 9 is a flowchart illustrating operations performed during a performance management process, according to one embodiment of the invention.

Details of operations performed during Performance Management 900 are shown in FIG. 9. As shown by start and end loop blocks 902 and 916, the operations in blocks 904-914 are performed for each target. In one embodiment, each target is considered on a partner-by-partner basis, rather than collectively for all search partners. The operations for a given target begin in a block 904, wherein the average cost per click (CPC) is calculated. Likewise, the average margin per click (MPC) is calculated in a block 906. Each of the CPC and MPC for a target may be derived directly from existing data in PERFORMANCE_HISTORY table 208.

For example, performance management is valuable in accessing performance of keywords relating to drug targets. One of the reasons for this is the MPC is extremely low on these keywords because a user cannot place an order on a first visit to the storefront. Prior to authorizing a prescription drug sale to the user, an appropriate verification check is performed, such as obtaining a copy of a prescription for the drug, checking with the user's doctor, etc. As a result, the MPC is much more difficult to calculate and requires the user of delayed-action data over a longer period of time.

In a block 908, a determination is made as to whether the target is cost effective. For example, one way of determining whether a target is cost effective is to compare how much it costs to how much marginal revenue is derived from its purchase with a given search partner. Clearly, if the cost, as measured by the CPC value greatly exceeds the MPC value, the target/partner combination is not cost effective. In cases in which the values for CPC and MPC are close, other considerations may also be considered, such as the number of sessions initiated by the target placement, the number of impressions relative to sessions (possibly indicative that the information in the search result needs to change).

Generally, the determination of cost-effectiveness may differ for each target type. For example, a longer time-frame is typically employed for accessing performance of keywords relating to drug targets. One of the reasons for this is the MPC is extremely low on these keywords because a user cannot place an order on a first visit to the storefront. Prior to authorizing a prescription drug sale to the user, an appropriate verification check is performed, such as obtaining a copy of a prescription for the drug, checking with the user's doctor, etc. As a result, the MPC is much more difficult to calculate and requires the user of delayed-action data over a longer period of time.

In connection with the operations of block 908, a determination is made in a block 910 as to whether the status of a target needs to be updated. This typically will be based on the MPC vs. CPC, although other performance data may also be considered. In general, the CPC and MPC calculation, while being performed periodically during the performance management operations, need not be over the same period as that used for Chron jobs 108 (or, more specifically, performance management 900). For example, the CPC and MPC values could be measured over a period of time, such as a week or a month to statistically smooth out cost effectiveness measurement anomalies. This would prevent the result of determining a target is not cost effective based on the performance of a particular day.

In response to the determination made in block 910, the target status for applicable targets is updated by changing the value of the TARGET_STATUS_ID attribute in TARGETS table 204 for each corresponding target. For instance, it may be determined that a target's performance is very poor, and thus the target status should be changed to inactive, so that the target's keyword is no longer purchased from all or a particular search partner.

In addition to determining target cost effectiveness, other performance information may also be derived from PERFORMANCE_HISTORY table 208. For example, it may be determined that the average position for a given target is too low. In some instances, a limited number of search results produced by a given search partner, such as three, may be syndicated to other search sites. If the average position is less than this limited number, the effectiveness of the target may be restricted. Under such circumstances, it may be advisable to adjust the bid for that target, as depicted by a block 914, which represents an optional operation.

System Architecture

An exemplary system architecture 1000 via which embodiments of the invention may be implemented is shown in FIG. 10*a*. The primary system entities include an electronic storefront 1002 and a search partner 1004. Architecture details shown for search partner 1004 are illustrative of a typical architecture that may be employed by one or more search partners.

The architecture illustrated for electronic storefront 1002 include various hardware and networking components that support execution of the software components shown in FIG. 1. In one embodiment, the hardware components include a plurality of computer servers that are configured to execute correspond software components via an "n-tier" configuration, which is well-known in the distributed processing arts. For example, a three-tier configuration is illustrated for electronic storefront 1002, and includes a Web server tier 1006, an application server tier 1008, and a database server tier 1010. In common parlance, Web server tier 1006 is known as the "frontend," while application server tier 1108 is known as the middle or middleware tier, and database server tier 1110 is known as the "backend." In one embodiment, each of the tiers includes one or more computer servers running respective sets of software common to that tier. The number of computer servers for each tier is generally independent, depending on the processing load on each tier. In other embodiments, the operations of one or more tiers may be performed by a single computer server, although this will usually lead to lower performance. In a typical implementation, the computer servers of the various tiers are linked in communication via a local area network (LAN) 1012.

A primary purpose of Web server tier 1006 is to provide a Web interface to the outside world. This is facilitated by Web server software 1014, which is used to serve a plurality of web pages 1016 that facilitate web operations for the electronic storefront. For example, Web pages 1016 include a home page, various catalog pages, customer sign-up and checkout pages, drug-related information, etc.

The computer servers in application server tier 1008 run the software components illustrated in FIG. 1, including Chron jobs 108 and XS API 106. In addition, electronic storefront applications to facilitate various middleware activities are also run in the application server tier; these application are collectively illustrated as store apps 1018. Software for facilitating XS partners API 112 may also run in the application server tier.

The database server tier is used to access (i.e., insert, update, delete, and retrieve) data stored in XS database 100, catalog database 102, data warehouse database 104 and a active session database 1019. Depending on the implementation, one (or more) respective (sets of) computer servers may be used to host each of databases 100, 102, and 104 via a respective set of database server software 1020. Optionally, a single computer server may be used to host two or more of the databases.

Generally, each of XS database 100, catalog database 102, and data warehouse database 104 will comprise an RDBMS database instance, although object-oriented databases may also be used. (It is noted that in this latter case, the database schema will be significantly different than that shown in FIG. 2.) Typically, each RDBMS database instance will be implemented via SQL-(structured query language) based database server software, such as one of the database server products provided by Oracle (e.g., Oracle 8i or 9i), Microsoft (SQL Server), IBM (DB2), Informix, or Sybase, to name a few. Accordingly, XS API 106 should be configured to provide an interface between the selected database server software 1020 and the various middleware software components.

The hardware architecture shown for search partner 1002 is illustrative of a server architecture that may be employed by a typical search partner. In the illustrative embodiment, a 3-tier architecture similar to that used for electronic storefront 1002 is used, including a Web server tier 1022, and application server tier 1024, and a database server tier 1026. The Web server tier runs web server software 1028 to serve search engine Web pages 1030, which are used for entering search request and presenting corresponding search results. In embodiments in which data exchanges are facilitated by web services, Web server tier 1022 also runs a Web service interface 1031.

As before, various middleware application run in application server tier 1024. These applications are used to process search requests and generate content corresponding to the search results, and are collectively depicted by search engine apps 1032. In addition, the middleware applications include a keyword management module 1034, which is illustrative of software that is used to manage keywords activities at the partner site, such as monitoring and tabulating keyword-generated search results and producing partner reports.

In one embodiment, the middleware software further includes a keyword interface 1036. This software interface enables bulk data to transmitted from and to search partner 1004 in a manner that bypasses Web server tier 1022. For example, the bulk data may include keyword-buy related data 1038 and partner reports 1040. In one embodiment, XS Partners API 112 is used to facilitate bulk data transfers at electronic storefront 1002. Typically, the bulk data transfers may be provided via a dedicated link 1042, such as a leased virtual private network (VPN) link.

For purposes of simplicity, the backend operations of the search partner are depicted as a single database server tier. In practice, each search partner will implement a proprietary search engine configuration that may include one or more database tiers. Database server tier 1026 provides a database interface 1044, and runs appropriate database software (not shown), which is used to host a plurality of databases 1046. Databases 1046 are illustrative of a typical database implementation hosted by a plurality of database instances. These instances may be centralized, or may be located at distributed locations.

The data in databases 1046 include keyword-based indexes, as well as other types of indexes, both types of which are collectively depicted as indexes 1048. The indexes, in turn, are linked to various URLs 1050 and associated content that is used to build the search results list. These data include the creative format data sent from the electronic storefront to the search partner.

Users may access both electronic storefront 1002 and search partner 1004 via corresponding web pages 1016 and 1030, which are served to various user clients 1046 via Internet 1048, which represents the World-Wide-Web.

Exemplary Computer Server

Figure 11:
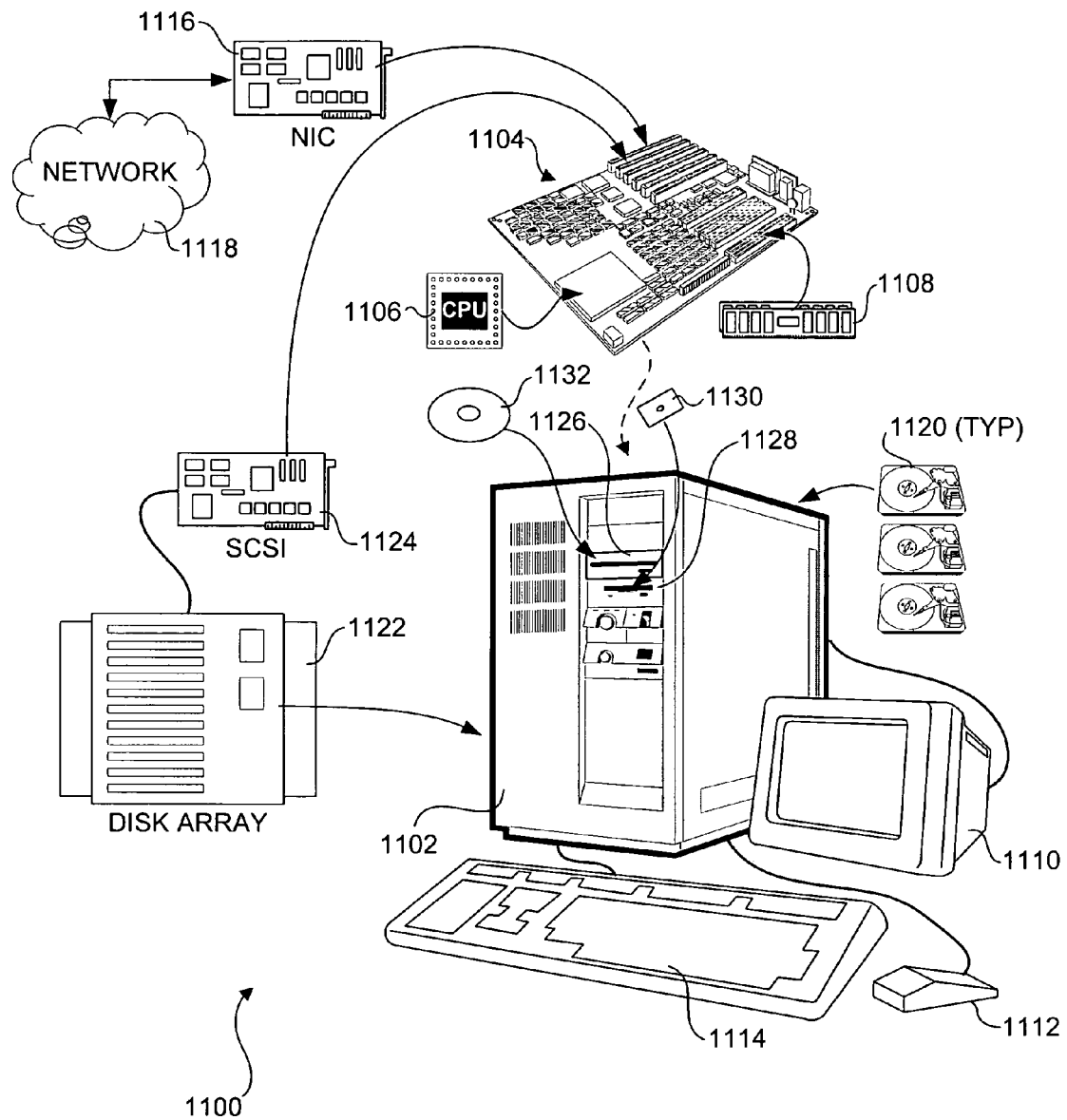
FIG. 11 is a schematic diagram of an exemplary computer server that may be employed for the servers in the architecture of FIG. 10.

With reference to FIG. 11, a generally conventional computer server 1100 is illustrated, which is suitable for use in connection with practicing the present invention. For example, computer server 1100 may be used for running the application server software components discussed above, such as Chron jobs 108. The same or preferably a separate computer server of similar architecture may be used for the Web server and database server tiers. Examples of computer systems that may be suitable for these purposes include stand-alone and enterprise-class servers operating UNIX-based and LINUX-based operating systems, as well as servers running the Windows NT or Windows 2000 or 2003 Server operating systems.

Computer server 1100 includes a chassis 1102 in which is mounted a motherboard 1104 populated with appropriate integrated circuits, including one or more processors 1106 and memory (e.g., DIMMs or SIMMs) 1108, as is generally well known to those of ordinary skill in the art. A monitor 1110 is included for displaying graphics and text generated by software programs and program modules that are run by the computer server. A mouse 1112 (or other pointing device) may be connected to a serial port (or to a bus port or USB port) on the rear of chassis 1102, and signals from mouse 1112 are conveyed to the motherboard to control a cursor on the display and to select text, menu options, and graphic components displayed on monitor 1110 by software programs and modules executing on the computer. In addition, a keyboard 1114 is coupled to the motherboard for user entry of text and commands that affect the running of software programs executing on the computer. Computer server 1100 also includes a network interface card (NIC) 1116, or equivalent circuitry built into the motherboard to enable the server to send and receive data via a network 1118.

File system storage corresponding to the invention may be implemented via one or more hard disks 1120 that are stored internally within chassis 1102, and/or via a plurality of hard disks that are stored in an external disk array 1122 that may be accessed via a SCSI card 1124 or equivalent SCSI circuitry built into the motherboard. Optionally, disk array 1122 may be accessed using a Fibre Channel link using an appropriate Fibre Channel interface card (not shown) or built-in circuitry.

Computer server 1100 generally may include a compact disk-read only memory (CD-ROM) drive 1126 into which a CD-ROM disk may be inserted so that executable files and data on the disk can be read for transfer into memory 1108 and/or into storage on hard disk 1120. Similarly, a floppy drive 1128 may be provided for such purposes. Other mass memory storage devices such as an optical recorded medium or DVD drive may also be included. The machine instructions comprising the software components that cause processor(s) 1106 to implement the operations of the present invention that have been discussed above will typically be distributed on CD-ROMs 432 (or other memory media) and stored in one or more hard disks 1120 until loaded into memory 1108 for execution by processor(s) 1106. Optionally, the machine instructions may be loaded via network 1118 as a carrier wave file.

Thus, embodiments of this invention may be used as or to support a software program executed upon some form of processing core (such as the CPU of a computer) or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method comprising:
   identifying target objects on an electronic storefront Web site to which customer traffic is to be targeted, wherein identifying the target objects includes performing a search for the target objects located in an electronic catalog separate from the electronic storefront Web site, wherein identifying the target objects for which keywords are automatically generated is performed periodically by a target discovery process and comprises identifying any new target objects that have been added to the Web site since the last time the target discovery process was performed;
   automatically generating search keywords for the target objects that are identified and found by the search by
   determining at least one applicable target type for each of the identified target objects, and
   generating the search keywords for each of the determined at least one applicable target types;
   receiving search result data from a search partner identifying search terms used to retrieve search results containing links to target objects on the electronic storefront Web site;
   including those search terms as part of the search keywords that are purchased from the one or more partner sites;
   automatically generating formatted search result data corresponding to at least one keyword that is to be purchased;
   sending the formatted search result data for said at least one keyword to at least one of the one or more search partners;
   including the formatted search result data are in search results produced by said at least one of the one or more search partners in response to searches corresponding to said at least one keyword;
   initiating purchase of the search keywords from one or more search partners;
   receiving billing and keyword clickthrough data from the one or more search partners;
   automatically determining a cost effectiveness of each of the keywords; wherein the cost effectiveness of each keyword is determined by:
      calculating an average cost per click (CPC) value based on the billing and keyword clickthrough data received from the one or more search partners;
      monitoring customer session activities initiated in response to each keyword clickthrough;
      determining a margin per click (MPC) value comprising an average marginal profit for each customer session activity initiated by a keyword clickthrough for each keyword;
      and comparing the MPC and CPC values for each keyword;
   identifying target objects that were previously targeted for customer traffic that are related to catalog items that are either discontinued or currently unavailable; and
   deactivating the purchase of any keywords corresponding to the target objects that are so identified.

2. The method of claim 1, wherein the cost effectiveness of each keyword is determined for each search partner on an individual search partner basis.

3. The method of claim 1, further comprising automatically deactivating a keyword when it is determined to not be cost effective.

4. The method of claim 1, wherein the CPC and MPC values are compared for each keyword at each of the one or more search partners.

5. The method of claim 1, wherein purchase of keywords is automatically initiated by electronically interfacing with the search partner to exchange data identifying the keywords to be purchased.

6. The method of claim 1, wherein the formatted search result data is automatically generated by performing operations including:
   creating a plurality of formatted search result templates;
   selecting one of the plurality of formatted search result templates applicable for a given
   keyword and search partner; and
      filling in the formatted search result template with information corresponding to a catalog
   item for which a corresponding keyword was automatically generated.

7. The method of claim 6, wherein the plurality of formatted search result templates includes templates that are particular to at least one of a product, a brand, and a product category.

8. The method of claim 1, wherein at least one formatted search result includes a destination URL containing embedded information identifying at least one of a product, brand, or category associated with the corresponding keyword.

9. The method of claim 1, wherein at least one formatted search result includes a price corresponding to a target object for which the keyword was automatically generated.

10. The method of claim 1, further comprising:
    identifying target objects corresponding to items in the electronic catalog that were
    previously unavailable but are now available; and
    reactivating purchase of the keywords corresponding to those target objects.

11. The method of claim 1, wherein the keywords are purchased from a search partner by sending a document to the search partner containing a list of keywords to be purchased along with bids for keywords.

12. The method of claim 11, wherein the document comprises one of a spreadsheet, database table, or an XML (extended markup language) document.

13. A The method of claim 1, further comprising:
    changing a purchase status of at least one of keyword with a search partner by electronically interfacing with the search partner via a Web service.

14. The method of claim 1, wherein the target objects include at least one of a product, brand, category, drug, and URL.

15. The method of 1, wherein search keywords for applicable target types include at least one of a product-based, brand-based, category-based, drug-based, and URL-based search keywords for each target object.

16. A machine-readable medium having instructions stored thereon, which when executed perform operations comprising:
    identifying target objects on an electronic storefront Web site to which customer traffic is to be targeted, wherein identifying the target objects includes performing a search for the target objects located in an electronic catalog separate from the electronic storefront Web site, wherein identifying the target objects for which keywords are automatically generated is performed periodically by a target discovery process and comprises identifying any new target objects that have been added to the Web site since the last time the target discovery process was performed;

automatically generating search keywords for the target objects that are identified and found by the search by determining at least one applicable target type for each of the identified target objects, and generating the search keywords for each of the determined at least one applicable target types;

receiving search result data from a search partner identifying search terms used to retrieve search results containing links to target objects on the electronic storefront Web site;

including those search terms as part of the search keywords that are purchased from the one or more partner sites;

automatically generating formatted search result data corresponding to at least one keyword that is to be purchased;

sending the formatted search result data for said at least one keyword to at least one of the one or more search partners;

including the formatted search result data are in search results produced by said at least one of the one or more search partners in response to searches corresponding to said at least one keyword;

initiating purchase of the search keywords from one or more search partners;

receiving billing and keyword clickthrough data from the one or more search partners;

automatically determining a cost effectiveness of each of the keywords; wherein the cost effectiveness of each keyword is determined by:

calculating an average cost per click (CPC) value based on the billing and keyword clickthrough data received from the one or more search partners;

monitoring customer session activities initiated in response to each keyword clickthrough;

determining a margin per click (MPC) value comprising an average marginal profit for each customer session activity initiated by a keyword clickthrough for each keyword;

and comparing the MPC and CPC values for each keyword;

identifying target objects that were previously targeted for customer traffic that are related to catalog items that are either discontinued or currently unavailable; and deactivating the purchase of any keywords corresponding to the target objects that are so identified.

\* \* \* \* \*